United States Patent [19]

Renfrew

[11] Patent Number: 4,472,575
[45] Date of Patent: Sep. 18, 1984

[54] TRIPHENDIOXAZINE DYESTUFFS

[75] Inventor: Andrew H. M. Renfrew, Lancashire, England

[73] Assignee: Imperial Chemical Industries PLC, London, England

[21] Appl. No.: 452,806

[22] Filed: Dec. 23, 1982

[30] Foreign Application Priority Data

Jan. 27, 1982 [GB] United Kingdom ............... 8202286

[51] Int. Cl.³ .......................................... C07D 498/04
[52] U.S. Cl. ........................................ 544/76; 544/75
[58] Field of Search .................................. 544/75, 76

[56] References Cited

U.S. PATENT DOCUMENTS

| 3,996,221 | 12/1976 | Leng | 544/75 X |
| 4,092,478 | 5/1978 | Plant | 544/76 |
| 4,213,899 | 7/1980 | Phillips et al. | 260/156 |
| 4,400,504 | 8/1983 | Harms et al. | 544/76 |

FOREIGN PATENT DOCUMENTS

| 2600490 | 7/1976 | Fed. Rep. of Germany . |
| 781384 | 8/1957 | United Kingdom . |
| 942555 | 11/1963 | United Kingdom . |
| 1349513 | 4/1974 | United Kingdom . |
| 1368158 | 9/1974 | United Kingdom . |
| 2059985 | 4/1981 | United Kingdom . |

Primary Examiner—Richard Raymond
Attorney, Agent, or Firm—Cushman, Darby & Cushman

[57] ABSTRACT

A dyestuff of the formula:

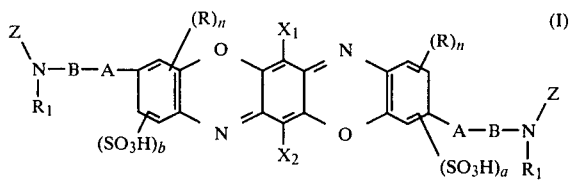

wherein:
the groups $X_1$ and $X_2$ are independently hydrogen, halogen, alkyl, alkoxy or aryl;
$(R)_n$ represents n substituents R each of which is independently halogen, lower alkyl, lower alkoxy or COOH and n is 0 or 1;
$a+b$ is 0 to 4;
A is O, S or $NR_2$ wherein $R_2$ is H or optionally substituted lower alkyl;
B is an optionally substituted aliphatic or optionally substituted araliphatic group;
$R_1$ is hydrogen, optionally substituted lower alkyl, optionally substituted aryl or optionally substituted aralkyl; and
Z is an aromatic nitrogen ring heterocycle devoid of cellulose-reactive groups.

The dyestuffs are valuable for the coloration of cellulose especially in the form of paper. The resulting colored cellulose is a bright blue with good fastness properties.

8 Claims, No Drawings

TRIPHENDIOXAZINE DYESTUFFS

This invention relates to novel triphendioxazine dyes and methods for their preparation.

According to the present invention there is provided a dyestuff of the formula:

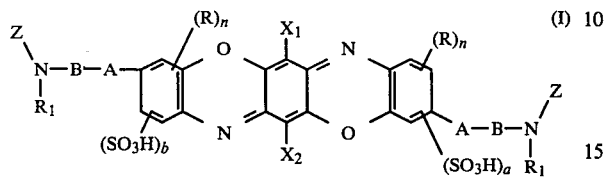

wherein:
- the groups $X_1$ and $X_2$ are independently hydrogen, halogen, alkyl, alkoxy or aryl;
- $(R)_n$ represents n substituents R each of which is independently halogen, lower alkyl, lower alkoxy or COOH and n is 0 or 1;
- $a+b$ is 0 to 4;
- A is O, S or $NR_2$ wherein $R_2$ is H or optionally substituted lower alkyl;
- B is an optionally substituted aliphatic or optionally substituted araliphatic group;
- $R_1$ is hydrogen, optionally substituted lower alkyl, optionally substituted aryl or optionally substituted aralkyl; and
- Z is an aromatic nitrogen ring heterocycle devoid of cellulose-reactive groups.

The term "lower alkyl" means having from 1 to 4 carbon atoms.

The groups $X_1$ and $X_2$ are both preferably chloride.

In the groups $(R)_n$, n is preferably 0 or when n is 1, the groups R are preferably the same and R is preferably a halide group, especially chloride.

Preferably both a and b are 1.

The group A is preferably —NH—.

As examples of groups represented by B there may be mentioned ethylene, 1,2- and 1,3-propylene, 2-hydroxy-1,3-propylene, 1- and 2-phenyl-1,3-propylene, 2-(4'-sulphophenyl)-1,3-propylene, 1,4-, 2,3- and 2,4-butylene, 2-methyl-1,3-propylene, 2-methyl-2,4-pentylene, 2,2-dimethyl-1,3-propylene, 1-phenylethylene, 1-chloro-2,3-propylene, 1,6- and 2,5-hexylene, 2,3-diphenyl-1,4-butylene, 1(methoxycarbonyl)-1,5-pentylene, 1-carboxy-1,5-pentylene, 2,7-heptylene, 3-methyl-1,6-hexylene, —CH₂CH₂OCH₂CH₂—, —CH₂CH₂SCH₂CH₂—, —CH₂CH₂SSCH₂CH₂—,

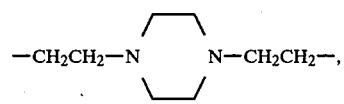

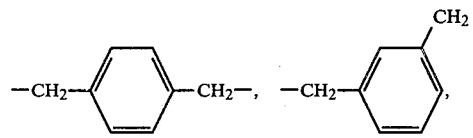

-continued

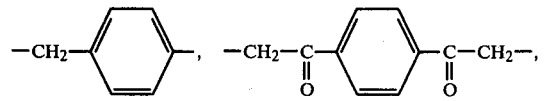

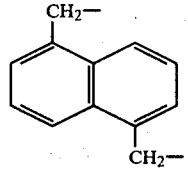

In those cases where A is $NR_2$ the group represented by $R_2$ may, in addition to the group A, be linked to both nitrogen atoms in the structure —A—B—$NR_1$—. As examples of such a grouping there may be mentioned

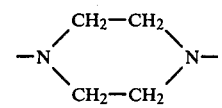

B is preferably a linear or branched chain aliphatic group containing from 2 to 6 carbon atoms, especially $C_3H_6$ or more especially —$C_2H_4$—.

As examples of atoms or groups represented by $R_1$ there may be mentioned H, methyl, ethyl, phenyl, 3- and 4-nitrophenyl, 3- and 4-sulphophenyl, benzyl, 3- and 4-sulphobenzyl, $CH_2SO_3H$, beta-hydroxyethyl and beta-sulphatoethyl.

Suitable aromatic nitrogen heterocycles (Z) devoid of cellulose-reactive groups include quinoxaline systems, pyrimidine systems and pyridine systems. Especially preferred groups Z however are triazine groups containing no cellulose-reactive substituents.

The group Z may be unsubstituted, but preferably contains one or more non-reactive substituents. Suitable non-reactive substituents are amino groups, optionally substituted alkyl or aryl amino groups acylamino groups, hydroxyl groups, alkylthio and arylthio groups and alkoxy and aryloxy groups.

Preferred forms of these groups include lower (i.e. $C_{1-4}$) alkoxy, e.g. methoxy, ethoxy, n-propoxy and iso-propoxy, butoxy and lower alkoxy lower alkoxy, e.g. beta-methoxy-ethoxy, beta-ethoxyethoxy; phenoxy and sulphophenoxy; amino; lower alkylamino, e.g. methylamino, ethylamino, butylamino, di(lower alkyl) amino, e.g. dimethylamino, diethylamino, methylethyl amino, dibutylamino and groups of the latter two types in which the alkyl groups are substituted in particular by OH, CN or $SO_3H$, e.g. beta-hydroxyethylamino, di(beta-hydroxyethyl)amino, beta-cyanoethylamino, di(beta-cyanoethyl)amino, beta-sulpho ethylamino, beta-hydroxypropylamino, (beta-hydroxybutyl)ethyl amino and (beta-hydroxyethyl)-methylamino; cycloalkylamino, e.g. cyclohexylamino; cyclic amino, e.g. morpholino or piperazino; naphthylamino substituted by 1, 2 or 3 $SO_3H$ groups and optionally substituted phenylamino groups.

As a particularly preferred form of the optionally substituted phenylamino groups there may be mentioned groups of the formula:

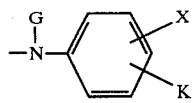

where G is H, methyl, ethyl, ω-sulphomethyl, beta-carboxyethyl, beta-hydroxyethyl or beta-cyanoethyl; and K and X are each independently selected from H, COOH, SO$_3$H, CH$_3$, C$_2$H$_5$, OCH$_3$, OC$_2$H$_5$, Cl, Br, CN, NO$_2$, NHCOCH$_3$, NH$_2$, phenylamino and methylamino.

As specific examples of such groups there may be mentioned anilino, o-, m- or p-sulphoanilino, o-, m- and p-carboxyanilino, 4- and 5-sulpho-2-carboxyanilino, 4- and 5-sulpho-o-tolylamino, 2,4-, 2,5- and 3,5-disulpho anilino, 2,4-dicarboxyanilino, 4- and 5-sulpho-2-methoxyanilino, N-methyl-o-, m- and p-sulphoanilino, N-ω-sulphomethylanilino, N-(beta-hydroxyethyl)-3-sulphoanilino.

An especially preferred group Z is the triazine group of formula II:

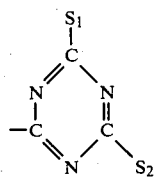

(II)

wherein S$_1$ and S$_2$ may be independently hydrogen or any of the non-reactive substituents described above. S$_1$ and S$_2$ may be the same or different. It is usually preferred that one of S$_1$ and S$_2$ is an arylamino especially a sulphonated arylamino and that the other is a non aryl group e.g. OH, NH$_2$, optionally substituted primary or secondary alkylamino or a cyclo aliphatic amino group such as cyclohexylamino, morpholino or piperidino.

Preferred sulphonated arylamino groups are sulphoanilino groups, the group 3-sulphoanilino- (derived from metanilic acid) being especially preferred. Thus an especially preferred group Z is

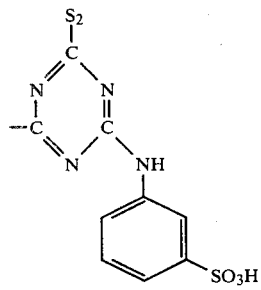

wherein S$_2$ is preferably an aliphatic amino group, for example a primary or secondary alkyl amino group containing a total of from 1 to 8 carbon atoms, or a cyclic aliphatic amino group such as morpholino- or piperidino-. The alkyl groups may be substituted preferably by OH.

The invention further provides a process for the manufacture of dyestuffs of formula (1) which comprises reacting the corresponding dyebase (i.e. a compound of formula I wherein both symbols Z now represent hydrogen and the other symbols have the meanings given above) with an aromatic ring heterocycle which contains at least one halogen atom attached to a carbon atom of the heterocyclic nucleus, followed by subsequent conversion of any residual cellulose-reactive groups to non-reactive groups.

Thus the aromatic ring heterocycle may possess a single halide group and the desired non-reactive groups, in which case the dyestuff of the present invention is manufactured directly. Preferably, however the aromatic ring heterocycle possesses two or three halide groups so that the first stage of the manufacture is the reaction of the dyebase with one of the halide groups of the aromatic ring heterocycle followed by subsequent conversion of the remaining one or two halide groups to the desired non-reactive groups.

For example, if the group Z in the dyestuff is the triazine group of formula II having non-reactive substituents S$_1$ and S$_2$, the dyestuff may be prepared by reaction of the dyebase with cyanuric chloride followed by reaction of the first remaining chloride group with the appropriate nucleophile S$_1$ (i.e. the appropriate amine, alcohol, thiol, etc. or water or ammonia) to form the group S$_1$ under relatively mild conditions, followed in turn by the reaction of the second remaining chloride group under more forcing conditions with the appropriate nucleophile to form the group S$_2$. Preferably, however the dyestuff is prepared by reaction with a triazine derivative from cyanuric chloride in which one of the chloride atoms has been replaced by the appropriate group S$_1$. The one remaining halogen atom in the product is then replaced by reaction with the appropriate nucleophile to form the substituent S$_2$.

Reaction of the dyebase with the aromatic ring heterocycle can conveniently be carried out by stirring a mixture of the reactants in an aqueous medium at a suitable temperature which may for example be from 0° C. to 60° C. Subsequent reaction of remaining halogen atom(s) with the appropriate nucleophile(s) will in general take place under more forcing conditions, for example at a temperature of from 30° C. to 100° C. It is generally preferred to add an acid-binding agent during the course of the reaction to maintain the pH within the limits 8 to 11.

The dyebase (the compound of formula I wherein both symbols Z now represent hydrogen and the other symbols have the meanings given above) is a known compound and may be prepared for example by the methods described in United Kingdom Patent Specification No. 1450746.

The dyestuffs may be isolated from the reaction medium by conventional means, for example salting out followed by filtration and drying out, for example by spray-drying the reaction mixture. If desired, stabilisers such as alkali metal hydrogen phosphates or diluents such as sodium chloride or urea may be added.

The dyes of the present invention are water-soluble dyes useful for the colouration of cellulosic materials, especially paper on which they give attractive and bright blue shades with or without the use of size. Because of their high tinctorial strength, the amount of dyestuff used to achieve quite deep shades is small, resulting in relatively economic dyeing. The light fastness and fastness to food solvents such as milk and cooking oil of the dyed paper is excellent.

The invention is illustrated by the following Examples in which all parts and percentages are by weight unless otherwise stated. The term "MI" indicates the weight of the material containing the molecular weight of pure compound.

EXAMPLE 1

Metanilic acid (MI.176; 7.04 parts) was dissolved in water (300 parts), the pH was adjusted to 7.0 and the solution was cooled to 5° C. Cyanuric chloride (8.01 parts) dissolved in acetone (100 parts) was added over 25 minutes while keeping the pH at 5.0. After 1 hour, a dyebase 3,10-bis-(beta-aminoethyl amino)-6,13-dichloro-4,11-disulphotriphendioxazine (MI.2487; 41.5 parts) in water (700 parts) was added, the pH was adjusted to 9.0 and the temperature was raised to 35° C. The suspension was stirred under these conditions for 6 hours.

Morpholine (17.4 parts) was then added and the solution was heated at 65°–70° C. for 2 hours. The solution was cooled, salted to 12% with sodium chloride, filtered and dried to give the product (MI.1923; 8.9 parts).

The product was a bright blue dye showing excellent light fastness. The product has the structure of formula I wherein n is 0; and a and b are both 1, and the two sulpho- groups are in positions 4 and 11 respectively; $X_1$ and $X_2$ are both chlorine atoms; A is —NH—; B is —$C_2H_4$— and Z has the formula II wherein $S_1$ is 3-sulphoanilino- and $S_2$ is -morpholino. $\lambda$max (water) 678 nm.

EXAMPLE 2

Orthanilic acid (MI.182; 3.64 parts) was dissolved in water (100 parts), the pH was adjusted to 6.0 and the solution was cooled to 5° C. Cyanuric chloride (4.06 parts) dissolved in acetone (50 parts) was added dropwise while keeping the pH at 5.0. After 3 hours, 3,10-bis-(beta-aminoethylamino)-6,13-dichloro-4,11-disulphotriphendioxazine (MI.2487; 20.7 parts) in water (500 parts) was added, the pH was adjusted to 9.0 and the temperature was raised to 35° C. The suspension was stirred under these conditions for 6 hours.

Hydrolysis of the remaining reactive chlorine was achieved by heating the above solution at 80° C. at a pH of 10.5 in the presence of pyridine (2 parts) for 3 hours. Cooling to room temperature and salting to 10% with sodium chloride gave the hydrolysed dyestuff, which was isolated by filtration and dried to give the product (MI.1733; 10 parts).

The product was a bright blue dye showing excellent light fastness. The product has the structure of formula I wherein n is 0; and a and b are both 1, and the two sulpho- groups are in positions 4 and 11 respectively; $X_1$ and $X_2$ are both chlorine atoms; A is —NH—; B is —$C_2H_4$— and Z has the formula II wherein $S_1$ is 2-sulphoanilino- and $S_2$ is -hydroxy. $\lambda$max (water) 623 nm.

EXAMPLE 3

3,10-Bis-(4-chloro-6-m-sulphoanilino-s-triazin-2-yl-aminoethylamino)-6,13-dichloro-4,11-disulphotriphendioxazine (M/60) was prepared as described in Example 1. Diethanolamine (60 parts) was added and the solution was heated to 65°–70° C. for 3 hours. The resultant solution was cooled to room temperature and the pH was adjusted to 7.0. 12% w/v sodium chloride was added and the solid was isolated by filtration to give the product (MI.2026; 21 parts).

The product was a bright blue dye showing excellent light fastness. The product has the structure of formula I wherein n is 0; a and b are both 1, and the two sulpho-groups are in positions 4 and 11 respectively; $X_1$ and $X_2$ are both chlorine atoms; A is —NH—; B is —$C_2H_4$— and Z has the formula II wherein $S_1$ is 3-sulphoanilino- and $S_2$ is diethanolamino-. $\lambda$max (water) 625 nm.

EXAMPLE 4

3,10-Bis-(4-chloro-6-m-sulphoanilino-s-triazin-2-yl-aminoethylamino)-6,13-dichloro-4,11-disulphotriphendioxazine (M/60) was prepared as described in Example 1. Ethanolamine (24.4 parts) was added and the solution was heated to 60°–65° C. for 2½ hours. The solution was cooled to room temperature and 20% w/v sodium chloride was added to give the desired product (MI.2199; 22.5 parts) which was isolated as in the previous Example.

The product was a bright blue dye showing excellent light fastness. The product has the structure of formula I wherein n is 0; a and b are both 1, and the two sulpho-groups are in positions 4 and 11 respectively; $X_1$ and $X_2$ are both chlorine atoms; A is —NH—; B is —$C_2H_4$— and Z has the formula II wherein $S_1$ is 3sulphoanilino- and $S_2$ is ethanolamino-. $\lambda$max (water) 624 nm

EXAMPLE 5

3,10-Bis-(4-chloro-6-m-sulphoanilino-s-triazin-2-yl-aminoethylamino)-6,13-dichloro-4,11-disulphotriphendioxazine (M/60) was prepared as described in Example 1. Piperidine (34.2 parts) was added and the solution was heated to 65°–70° C. for 2 hours. The solution was cooled to room temperature and the pH was adjusted to 7.0. 20% w/v sodium chloride was added and the solid was isolated by filtration to give the product (MI.3560; 36 parts).

The product was a bright blue dye showing excellent light fastness. The product as the structure of formula I wherein n is 0; a and b are both 1, and the two sulpho-groups are in positions 4 and 11 respectively; $X_1$ and $X_2$ are both chlorine atoms; A is —NH—; B is —$C_2H_4$— and Z has the formula II wherein $S_1$ is 3-sulphoanilino- and $S_2$ is piperidino-. $\lambda$max (water) 625 nm

EXAMPLE 6

Sulphanilic acid (MI.173; 3.46 parts) was dissolved in water (100 parts), the pH was adjusted to 7.0 and the solution was cooled to 5° C. Cyanuric chloride (3.7 parts) in acetone (50 parts) was added over 15 minutes while keeping the pH at 5.0. After 3 hours, 3,10-bis- are both chlorine atoms; A is —NH—; B is —C$_2$H$_4$— and Z has the formula II wherein S$_1$ is 3-sulphoanilino- and S$_2$ is amino-. λmax (water) 595 nm.

| Ex. No. | XX$_1$ | R | n | a | b | A | B | R$_1$ | Z | λmax |
|---|---|---|---|---|---|---|---|---|---|---|
| 8 | Cl | H | 1 | 1 | 1 | NH | —(CH$_2$)$_3$— | H | 4-β-hydroxyethylamino-6-m-sulphoanilino-s-triazin-2-yl | 625 |
| 9 | Cl | H | 1 | 1 | 1 | NH | —(CH$_2$)$_2$— | β-hydroxy-ethyl | 4-β-hydroxyethylamino-6-m-sulphoanilino-s-triazin-2-yl | 623 |
| 10 | Cl | H | 1 | 1 | 1 | NH | —(CH$_2$)$_2$— | H | 4-morpholinyl-6-p-sulpho-anilino-s-triazin-2-yl | 626 |
| 11 | Br | H | 1 | 1 | 1 | NH | —(CH$_2$)$_2$— | β-hydroxy-ethyl | 4-amino-6-m-sulphoanilino-s-triazin-2-yl | 620 |
| 12 | Cl | H | 1 | 1 | 1 | NH | —(CH$_2$)$_2$— | H | 4-methylamino-6-m-sulphoanilino-s-triazin-2-yl | 625 |
| 13 | Cl | H | 1 | 1 | 1 | NH | —(CH$_2$)$_2$— | H | 4-ethylamino-6-m-sulphoanilino-s-triazin-2-yl | 623 |

| Ex. No. | XX$_1$ | R | n | a | b | A | B | R$_1$ | Z |
|---|---|---|---|---|---|---|---|---|---|
| 14 | Br | H | 1 | 1 | 1 | NH | —(CH$_2$)$_2$— | H | 4-β-hydroxyethylamino-5-cyano-6-m-sulphoanilino-pyrimidin-2-yl |
| 15 | Cl | 2,9-dichloro | 1 | 1 | 1 | NH | —(CH$_2$)$_2$— | H | 4-β-hydroxyethylamino-6-m-sulphoanilino-s-triazin-2-yl |
| 16 | Cl | H | 1 | 1 | 1 | NH | —(CH$_2$)$_3$— | H | 4-hydroxy-6-m-sulphoanilino-s-triazin-2-yl |
| 17 | Cl | H | 1 | 1 | 1 | NH | —(CH$_2$)$_2$— | CH$_3$ | 4-β-hydroxyethylamino-6-m-sulphoanilino-s-triazin-2-yl |
| 18 | Cl | H | 1 | 1 | 1 | NH | —(CH$_2$)$_2$— | C$_2$H$_5$ | 4-β-hydroxyethylamino-6-m-sulphoanilino-s-triazin-2-yl |
| 19 | Cl | H | 1 | 1 | 1 | NH | —(CH$_2$)$_2$— | C$_2$H$_4$OSO$_3$H | 4-β-hydroxyethylamino-6-m-sulphoanilino-s-triazin-2-yl |

(beta-aminoethylamino)-6,13-dichloro-4,11-disulphotriphendioxazine (MI.2487; 20.7 parts) in water (500 parts) was added, the pH adjusted to 9.0 and the temperature was raised to 35° C. The suspension was stirred under these conditions for 6 hours.

Hydrolysis of the reactive chlorine was achieved by heating the above solution at 80°-85° C. at a pH of 10.5–11.0 in the presence of pyridine (2 parts) for 5 hours. Cooling to room temperature and salting to 20% w/v gave the desired product (MI.3119; 16.2 parts).

The product was a bright blue dye showing excellent light fastness. The product has the structure of formula I wherein n is 0; a and b are both 1, and the two sulphogroups are in positions 4 and 11 respectively; X$_1$ and X$_2$ are both chlorine atoms; A is —NH—; B is —C$_2$H$_4$— and Z has the formula II wherein S$_1$ is 4-sulphoanilino- and S$_2$ is -hydroxy. λmax (water) 621 nm

EXAMPLE 7

3,10-Bis-(4-chloro-6-m-sulphoanilino-s-triazin-2-yl-aminoethylamino)-6,13-dichloro-4,11-disulphotriphendioxazine (M/60) was prepared as described in Example 1. Ammonia (S.G.O.88) was added to give a pH of 10.5 and the solution was heated to 80°-85° C. while maintaining the pH at 10.5 with ammonia, for 3 hours. The pH was then adjusted to 7.0 and 20% w/v sodium chloride was added to salt out the product (MI.2162; 27 parts).

The product was a bright blue dye showing excellent light fastness. The product has the structure of formula I wherein n is 0; a and b are both 1, and the two sulphogroups are in positions 4 and 11 respectively; X$_1$ and X$_2$

I claim:
1. A dyestuff of the formula:

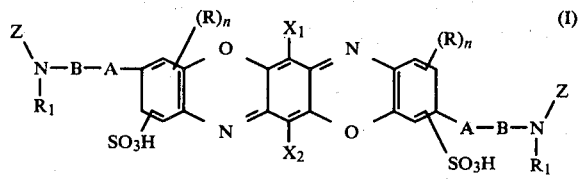

wherein:
the groups X$_1$ and X$_2$ are halogen;
(R)$_n$ represents n substituents R each of which may be halogen, and n is 0 or 1;
A is —NH—;
B is a linear or branched chain aliphatic group containing from 2 to 6 carbon atoms;
R$_1$ is selected from the group consisting of H, —CH$_3$, —C$_2$H$_5$, —C$_2$H$_4$OH and —C$_2$H$_4$OSO$_3$H; and
Z is selected from the group consisting of s-triazin-2-yl, pyrimidin-2-yl, pyridinyl and quinoxalinyl each being devoid of cellulose-reactive groups and having one or more non-reactive substituents selected from the group consisting of hydrogen; hydroxy; cyano; C$_1$ to C$_4$ alkoxy; amino; C$_1$ to C$_4$ alkylamino; di (C$_1$ to C$_4$ alkyl)amino; hydroxy(C$_1$ to C$_4$ alkyl)amino; di(hydroxy C$_1$ to C$_4$ alkyl)amino; morpholino; piperazino and phenylamino of the formula:

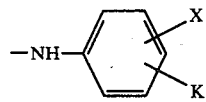

wherein K and X are each independently selected from the group consisting of H, COOH, SO$_3$H, CH$_3$, C$_2$H$_5$, OCH$_3$, OC$_2$H$_5$, Cl, Br, CN, NO$_2$, NHCOCH$_3$, NH$_2$, phenyl amino and methyl amino.

2. A dyestuff as claimed in claim 1 wherein —B— is —C$_3$H$_6$— or —C$_2$H$_4$—.

3. A dyestuff as claimed in claim 1 wherein Z is a substituted s-triazin-2-yl group.

4. A dyestuff as claimed in claim 1 wherein X$_1$ and X$_2$ are Cl and n is 0.

5. A dyestuff as claimed in claim 4 wherein z is a group of the formula:

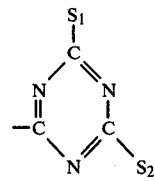

wherein one of S$_1$ and S$_2$ is a sulphanilino group and the other is a primary or secondary alkylamino group containing from 1 to 8 carbon atoms or a cycloaliphatic amino group.

6. A dyestuff as claimed in claim 5 wherein Z is a group of the formula:

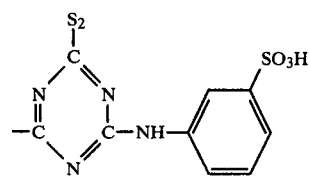

wherein S$_2$ is a primary or secondary alkylamino group containing from 1 to 8 carbon atoms or a primary or secondary alkyl group containing from 1 to 8 carbon atoms having a hydroxy substituent or a morpholino or piperidino group.

7. A dyestuff of the formula:

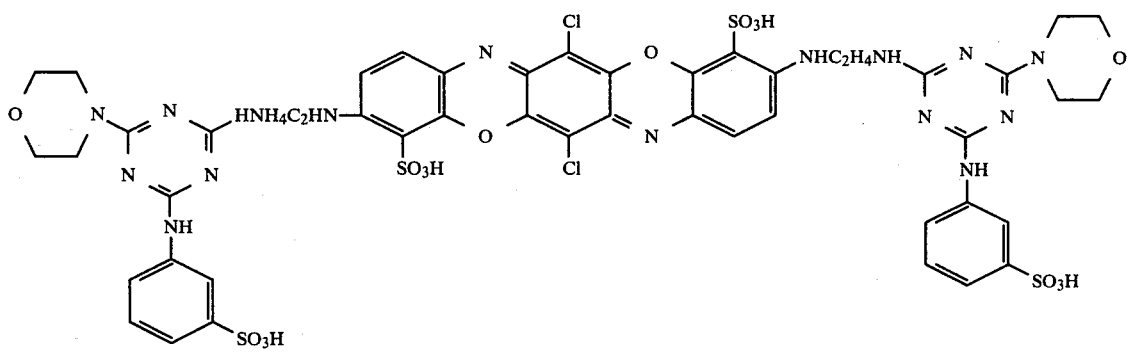

8. A dyestuff of the formula:

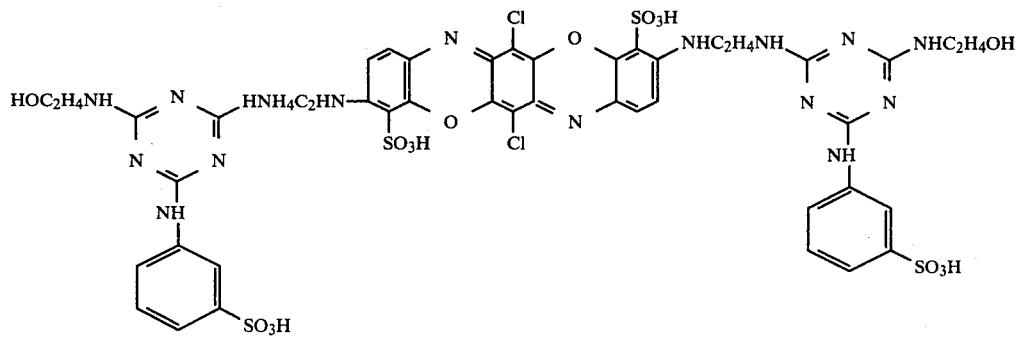

* * * * *